United States Patent
Zhang et al.

(10) Patent No.: US 12,212,234 B2
(45) Date of Patent: Jan. 28, 2025

(54) SWITCHING REGULATOR IMPLEMENTING NEGATIVE CURRENT PROTECTION

(71) Applicant: Alpha and Omega Semiconductor International LP, Toronto (CA)

(72) Inventors: Zhiye Zhang, San Jose, CA (US); Gilbert S. Z. Lee, Gyeonggi-do (KR)

(73) Assignee: Alpha and Omega Semiconductor International LP, Toronto (CA)

( * ) Notice: Subject to any disclaimer, the term of this patent is extended or adjusted under 35 U.S.C. 154(b) by 228 days.

(21) Appl. No.: 17/661,742

(22) Filed: May 2, 2022

(65) Prior Publication Data

US 2023/0353049 A1 Nov. 2, 2023

(51) Int. Cl.
*H02M 3/158* (2006.01)
*H02M 1/00* (2006.01)
*H02M 1/088* (2006.01)
*H02M 1/32* (2007.01)

(52) U.S. Cl.
CPC ......... *H02M 3/158* (2013.01); *H02M 1/0009* (2021.05); *H02M 1/088* (2013.01); *H02M 1/32* (2013.01)

(58) Field of Classification Search
CPC .... H02M 1/0009; H02M 3/156; H02M 3/158; H02M 1/32; H02M 3/165
See application file for complete search history.

(56) References Cited

U.S. PATENT DOCUMENTS

| | | | |
|---|---|---|---|
| 7,595,615 B2 | 9/2009 | Li et al. | |
| 8,222,879 B2 | 7/2012 | Nguyen | |
| 8,421,425 B1 | 4/2013 | Wu et al. | |
| 8,879,217 B2 | 11/2014 | Tang et al. | |
| 2006/0171182 A1 | 8/2006 | Siri et al. | |
| 2016/0172999 A1* | 6/2016 | Fogg | H02M 3/1588 363/53 |

FOREIGN PATENT DOCUMENTS

| | | |
|---|---|---|
| CN | 107634651 B | 2/2021 |
| CN | 114400899 A | 4/2022 |
| TW | 201440570 A | 10/2014 |

OTHER PUBLICATIONS

Office action and Search Report for corresponding Taiwan Patent Application No. 112113581, Sep. 22, 2023, 6 pages.

* cited by examiner

*Primary Examiner* — Gary L Laxton (57) ABSTRACT

A controller for a switching regulator incorporates a protection circuit to limit the negative current to a negative current threshold while operating the switching regulator to sink current from the load without damage to the power switches. In some embodiments, in response to the negative current reaching the negative current threshold, the protection circuit turns off the low-side power switch and turns on the high-side power switch for a maximum time period. In the event the negative current has not recovered, the high-side power switch and the low-side power switch are both turned off while the high-side power switch conducts the negative current through the high-side power switch body diode. When the negative current recovers to a recovery level, the low-side power switch can then be turned on. The protection circuit repeats the process each time the negative current is detected to have reached the negative current threshold.

12 Claims, 6 Drawing Sheets

SWITCHING REGULATOR IMPLEMENTING NEGATIVE CURRENT PROTECTION

FIELD OF THE INVENTION

The invention relates to switching power supplies and, in particular, to a switching regulator implementing negative current protection.

BACKGROUND OF THE INVENTION

Electronic systems, such as computers or computing systems, typically include power management integrated circuits for regulating the power usage of the electronic systems. Furthermore, electronic systems incorporating integrated circuits typically employ voltage regulators to convert a main bus voltage from a power source supplying the system to one or more voltages necessary for driving the integrated circuits therein. For example, a 5 volts supply voltage provided to an electronic system may need to be reduced to 1.8 volts to drive an integrated circuit in the electronic system. Computing systems include processors (or microcontrollers) and local memory coupled to components and executing embedded software to perform certain tasks. In practice, the processor power supply is provided by a voltage regulator converting an input voltage from a power source to a voltage value specified for the processor.

Switch mode power supplies or switching regulators, also referred to as DC to DC converters, are a type of voltage regulators often used to convert an input supply voltage to a desired output voltage at a voltage level selected for an integrated circuit. In one example, a 12V or 5V supply voltage may be reduced to 1V or 0.9V for supplying an embedded processor. A switching regulator provides power supply function through low loss components such as capacitors, inductors, and transformers, and power switches that are turned on and off to transfer energy from the input to the output. A feedback control circuit is used to regulate the energy transfer to maintain a constant output voltage within the desired load limits of the circuit.

A switching regulator can be configured to step up the input voltage or step down the input voltage or both. Specifically, a buck switching regulator, also called a "buck converter," steps down the input voltage while a boost switching regulator, also called a "boost converter," steps up the input voltage. A buck-boost switching regulator, or buck-boost converter, provides both step-up and step-down functions.

Some switching regulators employ pulse width modulation (PWM) to control the duty cycle of the power switches. That is, the on-time of the power switches may be controlled at a given fixed or variable frequency by adjusting the pulse width. Switching regulators employing PWM control include a PWM controller or modulator to drive a power stage including the power switches, the driver circuits for the power switches, and an LC filter circuit. The power stage, controlled by the PWM controller, transfers energy to the output node. In some cases, the switching regulator is a single phase converter and the PWM controller generates a single phase PWM signal to drive a single phase power block. In other cases, the switching regulator is a multi-phase converter and a multi-phase PWM controller generates switching signals with different phase shifts to drive a multi-phase power block, each PWM signal driving a respective power block cell. Multi-phase PWM controllers are desirable when the voltage regulator has to deliver high levels of power in a low profile solution or when a high conversion efficiency needs to be maintained over a wide range of load conditions.

The normal operation of the switching regulator includes positive current operation where the power stage sources current (positive current) to the load and negative current operation where the power stage sinks current (negative current) from the load. In some applications, negative current operation is used to improve performance of the host system, such as by performing load release (changing the load current from a high current value to a low current value or negative voltage transitions (changing the output voltage from a high value to a low value by discharging the output node). To ensure safe operation and to prevent damage to the power stage during the negative current operation, the negative current is typically limited to a given threshold and prevented from exceeding the predetermined threshold.

BRIEF DESCRIPTION OF THE DRAWINGS

Various embodiments of the invention are disclosed in the following detailed description and the accompanying drawings.

DETAILED DESCRIPTION

According to embodiments of the present invention, a controller for a switching regulator receiving an input voltage and generating a regulated output voltage incorporates a protection circuit to limit the negative current to a negative current threshold while operating the switching regulator in a tri-state mode to sink current from the load in a negative current operation without damage to the power switches. More specifically, in response to the negative current in the switching regulator reaching the negative current threshold, indicating an over-current event, the protection circuit turns off the low-side power switch and turns on the high-side power switch for a maximum time period. In the event the negative current has not recovered, the high-side power switch and the low-side power switch are both turned off (the tri-state mode) while the high-side power switch conducts the negative current through the high-side power switch body diode. When the negative current increases or recovers to a recovery level, indicating that the over-current event has past, the low-side power switch can then be turned on. The protection circuit repeats the process each time the negative current is detected to have reached the negative current threshold.

The protection circuit in the switching regulator of the present invention realizes many advantages over conventional negative current protection schemes. First, the protection circuit turns on the high-side power switch for only a given maximum time period. Imposing a maximum on time for the high-side power switch prevents the high-side power switch from damage in the event the negative current recovers very slowly and the high-side power switch is left turned on for a long time, which can result in damage to the high-side power switch due to drooping of the high-side gate drive voltage. Second, the protection circuit does not turn on the low-side power switch until the negative current has recovered to a given recovery level. In this manner, a negative current runaway condition is prevented.

In the following description, the negative current protection circuit and method is described in the context of being applied in a single-phase buck switching regulator. Those skilled in the art will appreciate that the negative current protection circuit and method described herein can be readily applied to other switching regulator architectures with minor modifications, if any, that are within the capability of one of ordinary skill in the art. For example, the negative current protection circuit and method of the present invention can be applied to any switching regulator architecture, including buck, boost, or buck-boost architecture. Furthermore, the negative current protection circuit and method of the present invention can be applied to a single-phase switching regulator or a multi-phase switching regulator. In the case of a multi-phase switching regulator, the negative current protection circuit can be implemented in each phase of the multi-phase switching regulator to provide negative current protection to each phase of the multi-phase switching regulator.

Figure 1:
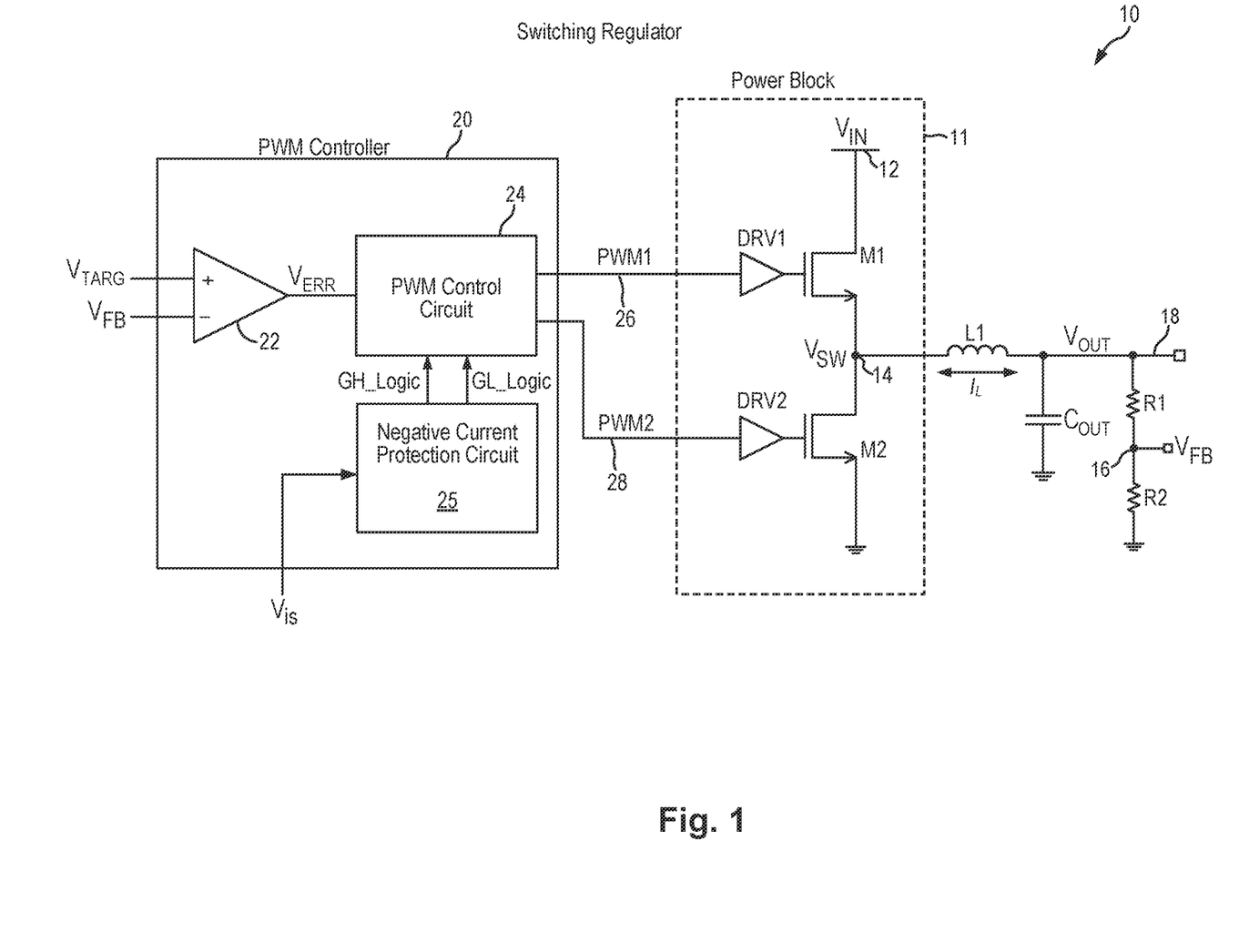
FIG. 1 is a schematic diagram of a switching regulator incorporating a negative current protection circuit in embodiments of the present invention.

FIG. 1 is a schematic diagram of a switching regulator incorporating a negative current protection circuit in embodiments of the present invention. In the embodiment shown in FIG. 1, the switching regulator employs pulse width modulation (PWM) to control the duty cycle of the power switches. That is, the on-time of power switches may be controlled at a given fixed or variable frequency by adjusting the pulse width of the power switch control signal. Switching regulators employing PWM control include a PWM controller or PWM modulator to drive a power stage including the power switches, the driver circuit for the power switches and an LC filter circuit. In the present description, the power switches together with the driver circuit are sometimes referred to as a power block. The power block is coupled to the LC filter circuit to supply energy to an output node. In some applications, the switching regulator may be employed in computing systems to supply power to processors, or microprocessors, or CPU or GPU. The switching regulator may receive an input voltage of 12V or 19V and may step down the input voltage to generate a regulated output voltage of 0.9V to power the processor integrated circuit.

Referring to FIG. 1, a switching regulator 10 includes a controller 20 coupled to drive a power block 11 which is coupled to an output inductor L1 and an output capacitor $C_{OUT}$. The power block 11 together with the output inductor L1 and the output capacitor $C_{OUT}$ are sometimes referred to as a power stage. The switching regulator 10 receives an input voltage $V_{IN}$ on an input node 12 and generates a regulated output voltage $V_{OUT}$ on an output node 18 to supply a load (not shown). The controller 20 implements pulse width modulation (PWM) and generates PWM signals to drive the power block 11. The power block 11 includes a pair of serially connected power switches M1, M2 which are turned on and off alternately by the PWM signals to regulate the output voltage $V_{OUT}$ with reference to a target voltage $V_{TARG}$ (also referred to as a reference voltage). The power switch M1 is referred to as the high-side power switch and the power switch M2 is referred to as the low-side power switch. The PWM controller 20 includes a PWM control circuit 24 which generates a first PWM signal PWM1 (node 26) to drive the high-side power switch M1 and generates a second PWM signal PWM2 (node 28) to drive the low-side power switch M2. The signals PWM1 and PWM2 are non-overlapping and are complement of each other when the switching regulator is operated in the continuous conduction mode, that is they are logically inverse of each other. In the present embodiment, the high-side power switch and the low-side power switch are both N-channel MOSFET devices or NMOS transistors. In other embodiments, the high-side power switch and the low-side power switch can be NPN bipolar transistors or N-channel heterostructure field effect transistors (HFET), for example, using GaN to form the channel.

As thus configured, the power switches M1 and M2 in the power block 11 are alternately turned on and off by the PWM signals PWM1 and PWM2 to generate a switching voltage $V_{SW}$ at a switching node 14. The output inductor L1 is coupled between the switching node 14 of the power block 11 and the output capacitor $C_{OUT}$ (node 18). The output inductor L1 and the output capacitor $C_{OUT}$ form an LC circuit for providing current to the output node 18 while maintaining a substantially constant output voltage $V_{OUT}$. The output voltage $V_{OUT}$ can then be used to drive a load.

The switching regulator 10 implements a feedback control loop to regulate the output voltage $V_{OUT}$. To that end, the controller 20 receives a feedback voltage $V_{FB}$ indicative of the regulated output voltage \Tour either at the output node 18 or at the load. In some examples, the feedback voltage $V_{FB}$ is a stepped down voltage of the output voltage $V_{OUT}$. For example, the feedback voltage $V_{FB}$ may be generated by a voltage divider including resistors R1 and R2 and the common node 16 between resistors R1 and R2 provides the divided down output voltage as the feedback voltage $V_{FB}$. The controller 20 also receives the reference voltage or target voltage $V_{TARG}$ indicative of the voltage value desired for the regulated output voltage or feedback point.

The controller 20 includes circuitry to implement the feedback control loop of the switching regulator to generate the PWM signals to drive the power block 11. In particular, the controller 20 includes an error amplifier 22 coupled to compare the feedback voltage $V_{FB}$ to the target voltage $V_{TARG}$ to generate a control loop error signal $V_{ERR}$. The error signal $V_{ERR}$ can be a voltage signal or a current signal. For example, the error amplifier 22 may generate an output current which can be converted to a voltage signal by a loop filter (not shown) coupled to the output of the error amplifier 22. The error signal $V_{ERR}$ is provided to the PWM control circuit 24, which may include circuitry such as a modulating comparator and a latch circuit to generate the PWM signals. The PWM signals PWM1 and PWM2 thus generated are coupled to respective driver circuits DRV1 and DRV2 to drive the respective power switches M1 and M2. As described above, the PWM signals are typically inverse of each other. In this manner, the high-side power switch M1 and the low-side power switch M2 are turned on and off alternately by the PWM signals.

In the present example, the switching regulator 10 is configured as a buck regulator to step down the input voltage $V_{IN}$ (e.g. 19V) to generate an output voltage $V_{OUT}$ having a lower voltage value than the input voltage (e.g. 1.8V). The controller 20 generates the PWM signals having a first signal portion and a second signal portion. The first signal portion of the PWM signals turns on the high-side power switch M1 (and turns off the low-side power switch M2) to cause a current to flow from the input voltage node 12, through the high-side switch M1 to the inductor L1. The inductor L1 stores the charge from the current flow. The second signal portion of the PWM signals turns on the low-side power switch M2 (and turns off the high-side power switch M1) to connect the switching node 14 to the ground potential through the low-side power switch M2. As a result, the switching regulator 10 delivers the stored charge in the inductor L1 to the output capacitor $C_{OUT}$. The switching voltage $V_{SW}$ switches between the input voltage $V_{IN}$ and the ground potential and the LC filter circuit formed by the inductor L1 and the output capacitor $C_{OUT}$ generates the regulated output voltage having a substantially constant magnitude.

The switching regulator 10 in FIG. 1 illustrates a single phase voltage regulator. In other examples, the switching regulator may be implemented as a multi-phase voltage regulator. A multi-phase switching regulator includes a multi-phase controller generating a set of PWM signals for driving a multi-phase power stage. In the present example, the multi-phase power stage includes multiple power blocks, each power block coupled to respective output inductor connected to the respective switching node. The multiple power blocks connect to an output capacitor Com' to form the multi-phase power stage. The output capacitor is connected to the output node to provide the output voltage $V_{OUT}$ The output voltage $V_{OUT}$ can then be used to drive a load. The multi-phase controller receives the feedback voltage $V_{FB}$ and the reference voltage $V_{TARG}$ and generates a set of PWM signals having different phases to drive the respective power blocks. The multi-phase controller enables the switching regulator to deliver a regulated output voltage with high precision over a wide range of load conditions.

In normal operation, the switching regulator 10 may source current to the load (node 18). The sourcing current is also referred to as a positive current. The switching regulator 10 may also sink current from the load (node 18). The sinking current is also referred to as a negative current. In embodiments of the present invention, the controller 20 incorporates a negative current protection circuit 25 to protect the power switches M1 and M2 from excessive negative current which may damage the power switches. The construction and implementation of the negative current protection in the protection circuit 25 will be described in more details below. In brief, the protection circuit 25 receives a current sense signal indicative of a current flowing through the power switches in the power block 11. In the present embodiment, the current sense signal is a voltage signal Vis. The current sense signal can be generated by measuring the inductor current $I_L$, or the current flowing through the low-side power switch M2 and/or the current flowing through the high-side power switch M1. The protection circuit 25 monitors the current sense signal Vis to determine if the negative current has reached a predetermined threshold, indicating a negative over-current event. In response to a detected negative over-current event, the protection circuit 25 generates a high-side gate drive logic signal GH_logic and a low-side gate drive logic signal GL_logic. The high-side and low-side gate drive logic signals GH_logic and GL_logic are provided to the PWM control circuit 24 and override the PWM signals that are generated in normal operation. In this manner, the power block 11 are controlled by the logic signals GH_logic and GL_logic to operation in a negative current protection mode. The protection circuit 25 detects when the negative over-current event has lapsed and releases control of the high-side and low-side drive signals. The PWM control circuit 24 can then resume normal operation.

Figures 2, 3:
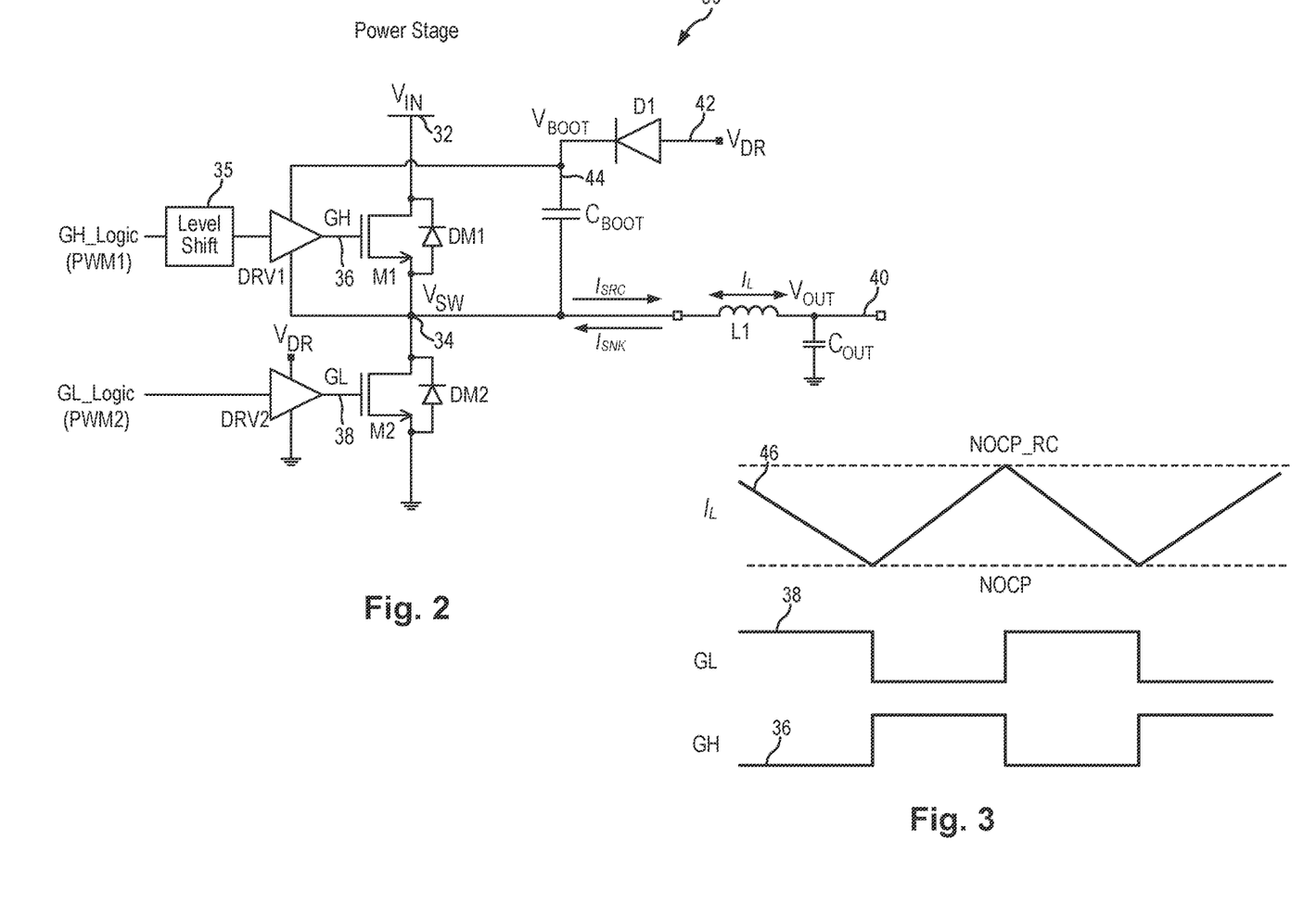
FIG. 2 is a schematic diagram of a power block including a boot circuit in some embodiments.
FIG. 3 illustrates the negative current behavior in a power block of a switching regulator in some examples.

In the present embodiment, the power switches M1 and M2 in the power block 11 are both NMOS transistors. To ensure that there is sufficient gate-to-source voltage to turn on the high-side power switch M1, a boot circuit is typically used to boost the gate-to-source voltage for the high-side switch M1. FIG. 2 is a schematic diagram of a power block including a boot circuit in some embodiments. Referring to FIG. 2, a power stage 30 includes a pair of serially connected power switches M1, M2 connected between the input voltage $V_{IN}$ (node 32) and ground. Power switches M1 and M2, also referred to as the high-side power switch and the low-side power switch, are both NMOS transistors in the present embodiment. The source terminal of the high-side power switch M1 is connected to the drain terminal of the low-side power switch M2 which is the switching node 34 providing the switching voltage $V_{SW}$. With the high-side switch M1 and the low-side switch M2 turning on and off alternately, the switching voltage $V_{SW}$ switches between the input voltage $V_{IN}$ (node 32) and the ground potential. When the source terminal of the high-side power switch M1 is at the input voltage $V_{IN}$, there needs to be a sufficient gate-to-source voltage across the power switch M1 to turn on the NMOS power switch M1. That is, to turn on the high-side power switch, the gate drive signal GH (node 36) at the gate terminal of power switch M1 needs to have a voltage value higher than the input voltage $V_{IN}$ in order to turn on the NMOS transistor.

To that end, a boot circuit including a capacitor $C_{BOOT}$ and a diode D1 is provided to boost the gate drive signal GH (node 36). A drive voltage $V_{DR}$ is coupled to the cathode (node 42) of diode D1. The capacitor $C_{BOOT}$ is connected between the anode (node 44) of diode D1 and the switching node 34. A voltage $V_{BOOT}$ is provided at the top plate (node 44) of the capacitor $C_{BOOT}$. In operation, when the low-side power switch M2 is on (and the high-side power switch M1 is turned off), the switching voltage $V_{SW}$ (node 34) is at ground potential and the diode D1 is forward biased so that the capacitor $C_{BOOT}$ is charged up to the drive voltage $V_{DR}$ through the diode D1. Then, when the high-side power switch M1 is turned on (and the low-side power switch is turned off), the switching voltage $V_{SW}$ (node 34) is at the input voltage $V_{IN}$ and the diode D1 is reverse biased, preventing current from flowing back to the drive voltage $V_{DR}$ (node 42). Meanwhile, the voltage $V_{BOOT}$ (node 44) is coupled to supply the driver circuit DRV1 for generating the gate drive signal GH. In the boot circuit, the diode D1 functions as a voltage blocking device. In other embodiments, other voltage blocking device may be used instead of a diode. The use of diode D1 as the voltage blocking device is illustrative only.

As thus configured, the voltage $V_{BOOT}$ has a voltage value of $V_{SW}+V_{DR}$. When the switching voltage $V_{SW}$ swings to the input voltage $V_{IN}$, the voltage $V_{BOOT}$ therefore has a voltage value of $V_{IN}+V_{DR}$. In one example, the input voltage $V_{IN}$ is 19V and the drive voltage $V_{DR}$ is 5V. When the gate drive signal GH has a logical high value, the gate drive signal GH has a voltage value of $V_{IN}+V_{DR}$ and the gate-to-source voltage of the power switch M1 is close to the drive voltage $V_{DR}$, ensuring that the power switch M1 is turned on sufficiently.

It is instructive to note that with the gate drive signal GH being boosted at the driver circuit DRV1, the input signal to the driver circuit (the gate drive logic signal GH_Logic or PWM1) will need to be level shifted to the appropriate voltage level. In the present embodiment, a level shifter circuit 35 is provided to shift the voltage levels of the gate drive logic signal GH_Logic or PWM1 to a voltage level suitable for the driver circuit DRV1.

Meanwhile, the driver circuit DRV2 for the low-side power switch M2 is powered by the drive voltage $V_{DR}$. The gate drive signal therefore has a voltage value of $V_{DR}$ for a logical high value, which is sufficient to turn on the low-side power switch M2 as the source terminal of the power switch M2 is at the ground potential. The gate drive logic signal GL_logic can be provided to the driver circuit DRV2 without any level shifting.

In operation, the power stage 30 turns the high-side power switch M1 and the low-side power switch M2 on and off alternately to generate the switching voltage $V_{SW}$ at the switching node 34. As a result of the switching voltage $V_{SW}$, an inductor current $I_L$ flows through the output inductor L1. As described above, the inductor current $I_L$ can be a sourcing or positive current flowing to the load or a sinking or negative current flowing from the load. Typically, the sourcing current $I_{SRC}$ flows from the input voltage $V_{IN}$ (node 32) through the high-side power switch M1 and the inductor L1 to the output node 40; and the sinking current $I_{SNK}$ flows from the output node 40 through the inductor L1 and the low-side power switch M2 to ground. To ensure safe operation, the positive current and the negative current are operated within a respective safe operating range to prevent damages to the power switches. If the positive or negative current exceeds the respective safe operating range, the power switches may suffer catastrophic damage.

In some examples, a positive current limit (over-current protection or OCP) is imposed to limit the amount of positive current that can flow through from the power stage 30 in each PWM cycle and a negative current limit (negative over-current protection or NOCP) is imposed to limit the amount of negative current that can flow into the power block 20 in each PWM cycle. The positive and negative current limits are set so that the power block can deliver effective current without damaging the power switches. Embodiments of the present invention provides protection circuit and protection scheme for protection against excessive negative current in a switching regulator.

FIG. 3 illustrates the negative current behavior in a power block of a switching regulator in some examples. Referring to FIG. 3, in normal operation, the gate drive signals GH and GL to the high-side and low-side power switches are complementary. Thus, when the gate drive signal GL (curve 38) is at a logical high level, the gate drive signal GH (curve 36) is at a logical low level, and vice versa. It is instructive to note that, in actual implementation, the gate drive signals GH and GL are non-overlapping and the transitions of the signals may have a gap duration. For example, the low-to-high transistor of the gate drive signal GH may occur a given duration after the high-to-low transition of the gate drive signal GL. Similarly, the low-to-high transistor of the gate drive signal GL may occur a given duration after the high-to-low transition of the gate drive signal GH. The duration at which both the gate drive signals GH and GL are logical low is sometimes referred to as the non-overlapping period or dead period and is usually a very short duration during the transitions of the two gate drive signals.

Curve 46 depicts the inductor current $I_L$, or the current flowing through the switching node 34 of the power stage 30. When the low-side power switch M2 is turned on, the inductor current $I_L$ is decreasing (with a negative slope) and may decrease below 0A to become a negative current. When the high-side power switch M1 is turned on, the inductor current $I_L$ is increasing (with a positive slope). In the depiction shown in FIG. 3, the inductor current $I_L$ is a negative current. In the present description, the negative current has a negative current value and is described as being "decreasing" when the negative current has an increasingly negative current value or the magnitude of the negative current is increasing (i.e. larger current magnitude). Furthermore, the negative current is described as being "increasing" when the negative current has an increasingly less negative current value or the magnitude of the negative current is decreasing (i.e. smaller current magnitude).

In some applications, the switching regulator is operated in the negative current mode to discharge the current or voltage at the load. In conventional operation, the low-side power switch is turned on (with the high-side power switch being turned off), the magnitude of the negative current increases (i.e. the negative current decreases) until the negative current reaches the negative current threshold (NOCP). When the negative current reaches the negative current threshold, the low-side power switch is turned off and the high-side power switch is turned on. The inductor current $I_L$ then increases and the magnitude of the negative current decreases (i.e. the negative current increases) until the negative current reaches a negative current recovery level (NOCP_RC or "recovery level"), indicating the negative over-current condition no longer exists. The switching regulator would then turn off the high-side power switch and turn on the low-side power switch and the negative current may decrease again (i.e. the magnitude of the negative current may increase). In one example, the negative current threshold (NOCP) is −40 A and the negative current recovery level (NOCP_RC) is −30 A.

Figure 4A:
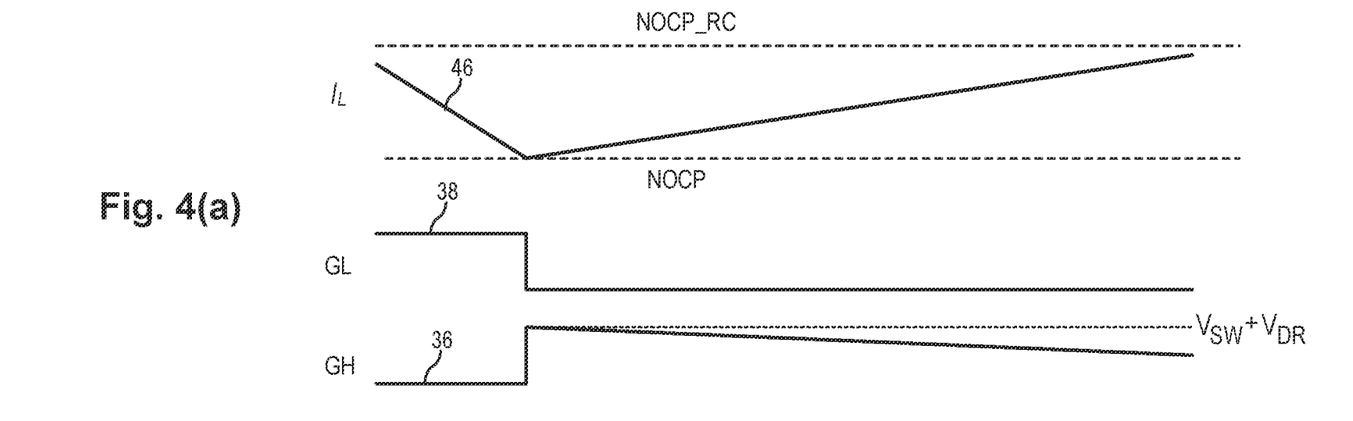
FIG. 4(a) illustrates the negative current behavior in a power block of a switching regulator in some examples.

The conventional negative current operations have several shortcomings. FIG. 4(a) illustrates the negative current behavior in a power block of a switching regulator in some examples. Referring to FIG. 4(a), in some cases, when the high-side power switch is turned on, the negative current recovery takes too long and the inductor current $I_L$ (curve 46) takes a long time to reach the negative current recovery level (NOCP_RC). This can occur when the output voltage of the switching regulator is close to the input voltage, that is, voltage $V_{OUT}$ is close to voltage $V_{IN}$. In that case, the high-side power switch is left turn on for a long time while the inductor current ramp up slowly. Meanwhile, the high-side power switch is turned on by the gate drive signal GH which is boosted by the voltage $V_{BOOT}$. Referring to FIG. 2, the voltage $V_{BOOT}$ is generated by charging the capacitor $C_{BOOT}$ during the time period when the low-side power switch is turned on and the switching node 34 is connected to ground. Thus, when the high-side switch is left turned on for a long time, the voltage $V_{BOOT}$ will droop due to operating current for the high-side power switch as well as leakage current from the capacitor $C_{BOOT}$ or at the diode D1. When voltage $V_{BOOT}$ droops, the gate-to-source voltage driving the high-side power switch decreases and the high-side power switch may become operated in the linear or triode mode with high drain-to-source resistance while conducting large amount of current. Accordingly, the high-side power switch may operate at a high power level (Power=$I_L^2$*Rds) which may cause damage to the high-side power switch.

Figure 4B:
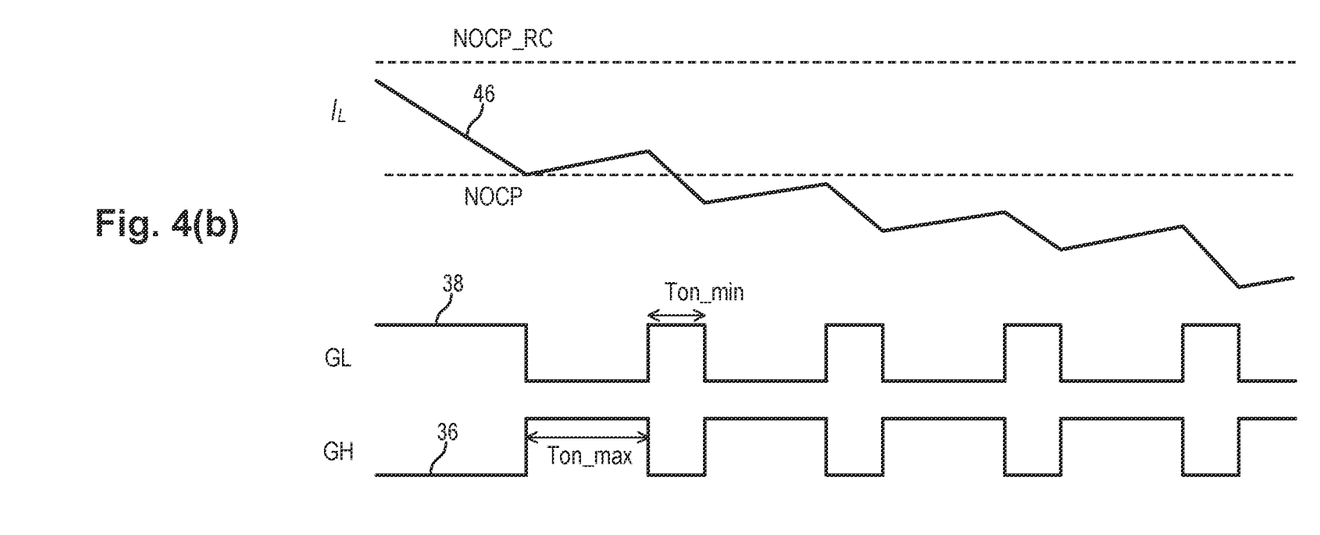
FIG. 4(b) illustrates the negative current behavior in a power block of a switching regulator in other examples.

FIG. 4(b) illustrates the negative current behavior in a power block of a switching regulator in other examples. Referring to FIG. 4(b), in order to avoid keeping the high-side power switch turned on for a long time, a maximum on time (Ton_max) may be imposed on the high-side gate drive signal GH. Accordingly, each time the high-side power switch is turned on, the high-side power switch is turned on up to the maximum on time. Even if the negative current has not recovered to the recovery level (NOCP_RC), the high-side power switch is turned off and the low-side power switch is turned on for a minimum on time (Ton_min). However, repeatedly turning on the low-side power switch for the minimum on time during a negative over-current event can lead to negative current runaway as the negative current keeps decreasing (the magnitude of the negative current keeps increasing) each time the low-side power switch is turned on.

In embodiments of the present invention, a negative current protection circuit and method is provided which overcome the shortcomings of the conventional operations. Referring back to FIG. 1, the negative current protection circuit 25 is incorporated into controller 20 to generate the gate drive signals for the high-side power switch and the low-side power switch in response to detection of a negative over-current event. The negative current protection circuit 25 receives the current sense signal Vis indicative of a current flowing through the power switches in the power block 11 and generates the high-side gate drive logic signal GH_logic and a low-side gate drive logic signal GL_logic which override the PWM signals generated by the PWM control circuit 24. The high-side gate drive logic signal GH_logic and the low-side gate drive logic signal GL_logic control the power block 11 in a way to provide negative current protection to the power block without the adverse effects described above, such as causing damage to the high-side power switch or allowing for negative current runaway.

Figures 5, 6:
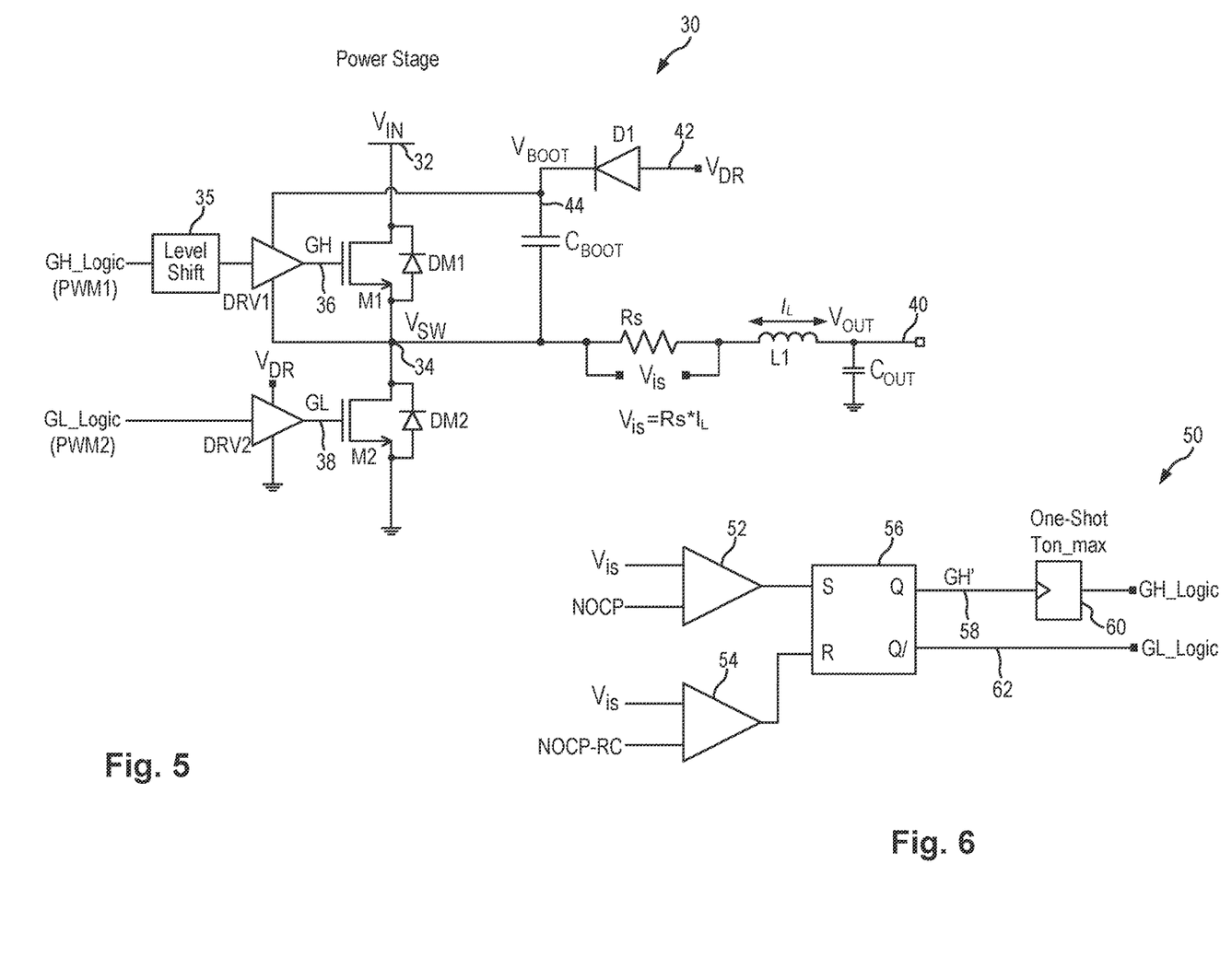
FIG. 5 is a schematic diagram of a power block including a boot circuit in some embodiments.
FIG. 6 is a schematic diagram of a negative current protection circuit in some embodiments.

FIG. 5 is a schematic diagram of a power block including a boot circuit in some embodiments. In particular, FIG. 5 is a duplicate of FIG. 2 with the addition of a current sensing circuit. Like elements in FIGS. 2 and 5 are given like reference numerals and will not be further described. In the embodiment shown in FIG. 5, the power stage 30 implements inductor current sensing using a resistor Rs connected in series with the inductor L1. A voltage Vis develops across the resistor Rs indicative of the inductor current flowing through the resistor. In particular, Vis=Rs*$I_L$. The voltage Vis is used as the current sense signal to indicate the magnitude of the inductor current flowing into or out of the power stage 30.

The current sensing circuit and method shown in FIG. 5 is illustrative only and not intended to be limiting. Other methods for sensing the inductor current in a switching regulator may be used. The method for current sensing is not critical in the practice of the present invention. In other examples, the current sensing can be implemented by measuring the current flowing through the low-side power switch, the high-side power switch, or both.

FIG. 6 is a schematic diagram of a negative current protection circuit in some embodiments. It is instructive to note that the logic circuit in FIG. 6 is illustrative only and not intended to be limiting. It is understood that other arrangement of logic elements can be used to realize the same logical operation for generating the desired gate drive logic signals for negative current protection. FIG. 6 illustrates one exemplary embodiment of a logic circuit to implement the negative current protection circuit in some examples of the present invention. Referring to FIG. 6, a negative current protection circuit 50 receives a current sense signal Vis indicative of the inductor current flowing into or out of the power stage. The protection circuit 50 also receives a signal indicative of the negative current threshold NOCP. The negative current threshold NOCP indicates the lower limit on the negative current. That is, the negative current should not exceed the negative current threshold NOCP. A negative over-current event is indicated when the current sense signal indicates the inductor current has reached the negative current threshold. The protection circuit 50 also receives a signal indicative of the negative current recovery level NOCP_RC ("recovery level") indicating recovery of the negative current and the end of the negative over-current event. The current sense signal Vis is compared to the negative current threshold NOCP and the recovery level NOCP_RC at respective comparators 52, 54. The output of the comparator 52, comparing the current sense signal Vis to the negative current threshold, is coupled to the set input of a Set-Reset Latch 56 ("SR Latch"). Meanwhile, the output of the comparator 54, comparing the current sense signal Vis to the recovery level, is coupled to the reset input of the SR Latch 56.

In particular, the current sense signal Vis is compared to the negative current threshold (NOCP) at the comparator 52. In response to the current sense signal Vis decreasing below the negative current threshold, the comparator 52 asserts its output to trigger the Set input of the SR Latch 56. As a result, the non-inverting output Q (node 58) of the SR Latch 56 is asserted. The non-inverting output Q, also denoted as signal GH', is coupled to a one-shot timer circuit 60 applying a maximum on time Ton_max to the signal GH'. The maximum on time Ton_max can be a fixed or variable value. Alternately, the maximum on time Ton_max can be a function of the input voltage or the output voltage or both of the switching regulator.

In response to the signal GH' being asserted, the one-shot timer circuit 60 generates the high-side gate drive logic signal GH_Logic having a maximum on duration. Meanwhile, the inverting output Q/(node 62) of the SR Latch 56 provides the low-side gate drive logic signal GL_Logic and is deasserted. As thus configured, high-side gate drive logic signal GH_Logic and low-side gate drive logic signal GL_logic are still logical complement of each other in that only one of the signals will be asserted at a time. The high-side gate drive logic signal GH_Logic is limited by the maximum on time Ton_max so that there is a period when both the high-side gate drive logic signal GH_Logic and the low-side gate drive logic signal GL_Logic are at logical low or deasserted. In the present description, the operating mode of the power stage where both the high-side power switch and the low-side power switch are turned off is referred to as the tri-state mode.

Meanwhile, the current sense signal Vis is also compared to the negative current recovery level (NOCP_RC) at the comparator 54. In response to the current sense signal Vis increasing above the negative current recovery level, the comparator 54 asserts its output to trigger the Reset input of the SR Latch 56. As a result, the non-inverting output Q (node 58) of the SR Latch 56 is deasserted and the high-side gate drive logic signal GH_logic is deasserted. It is instructive to note that the high-side gate drive logic signal GH_logic can be deasserted before the maximum on time duration set by the one-shot timer circuit 60. The one-shot timer circuit 60 sets the maximum on duration of the high-side power switch but the high-side power switch can be turned off before the maximum on duration when the negative current has recovered to the recovery level.

Meanwhile, with the Reset input being triggered, the inverting output Q/(node 62) of the SR Latch 56 is asserted and the low-side gate drive logic signal GL_Logic is at a logical high. The on-time of the low-side power switch can be fixed, such as a minimum on time, or can be variable. For example, the on-duration of the low-side power switch can be a function of the input voltage or the output voltage, or both, of the switching regulator. That is, the low-side power switch is not necessarily turned off only when the negative current reaches the negative current threshold.

The protection circuit 50 of the present invention implements a maximum on-time for the high-side power switch through the one-shot timer 60. In this manner, the high-side power switch would not be left on for a long time in the event the negative current recovery is slow. Meanwhile, the protection circuit 50 only turns on the low-side power switch when the negative current has recovered and the negative over-current event is deemed over. In this manner, negative current runaway is prevented. Furthermore, when the low-side power switch is turned on, the boot capacitor $C_{BOOT}$ is recharged and the boot voltage $V_{BOOT}$ is restored.

Figure 7:
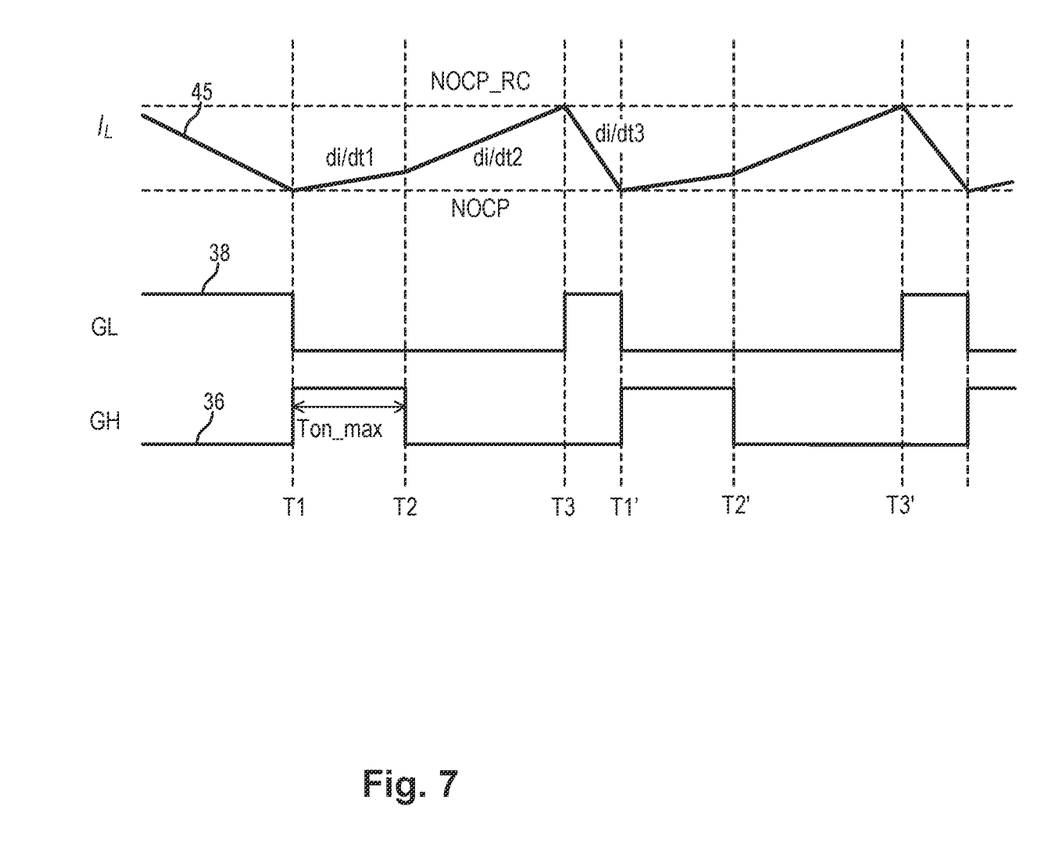
FIG. 7 includes signal waveforms for illustrating the operation of the negative current protection circuit of FIG. 6 in some examples.

FIG. 7 includes signal waveforms for illustrating the operation of the negative current protection circuit of FIG. 6 in some examples. In FIG. 7, curve 45 depicts negative current behavior in a power stage in some examples. The high-side gate drive signal GH (curve 36) and the low-side gate drive signal GL (curve 38) are generated as a result of the negative current protection circuit. Referring to FIG. 7, with the low-side power switch being turned on, at time T1, a negative over-current event is detected when the inductor current $I_L$ decreases to the negative current threshold NOCP. In that case, at time T1, the low-side power switch is turned off and the high-side power switch is turned on. As a result, the inductor current ramps up with a slope di/dt1=($V_{IN}$−$V_{OUT}$)/L1. In the present example, it is assuming that the slope di/dt1 is small and the inductor current does not ramp up very quickly.

At time T2, the maximum on time Ton_max for the high-side power switch is reached without the inductor current having increased to the negative current recovery level NOCP_RC. In that case, the high-side power switch is turned off as a result of the maximum on time and the low-side power switch remains turned off as a result of the negative current hasn't increased to the recovery level. During the time period T2 to T3, the power stage is operating in the tri-state mode with both high-side power switch and the low-side power switch both being turned off. During the time period T2 to T3, the negative current flows from the switching node 34 to the input voltage node 32 through the body diode DM1 of the high-side power switch M1 (FIG. 5). The inductor current ramps up with a slope di/dt2=($V_{IN}$+$V_{DM1}$−$V_{OUT}$)/L1, where $V_{DM1}$ denotes the voltage drop across the body diode DM1. Because of the high-side body diode DM1, the slope di/dt2 is larger than the slope di/dt1.

At time T3, the inductor current has reached the negative current recovery level NOCP_RC, indicating the negative over-current event is over. The low-side power switch can then be turned back on. The inductor current has a slope di/dt3 that is negative as the low-side power switch is turned on. In particular, di/dt3=−$V_{OUT}$/L1. Meanwhile, the capacitor $C_{BOOT}$ is being charged during the duration when the low-side power switch is turned on, restoring the voltage $V_{BOOT}$ to the desired $V_{SW}$+$V_{DR}$ level.

With the inductor current reaches the negative current recovery level, the power switches can return to normal PWM operation until another negative over-current event is detected. When another negative over-current event is detected, the negative current protection circuit operates in the same manner as described above to limit the negative current to a threshold and also to allow the negative current to recover before turning the low-side power switch back on. When the negative current protection circuit detects a negative over-current event, there will be periods where both the high-side power switch and the low-side power switch are turned off. This time period, referred to as the "tri-state mode" in the present description, is distinguished from the dead period which is used to provide non-overlapping transitions of the high-side drive signal and the low-side drive signal. Rather, the protection circuit of the present invention, in response to detecting a negative over-current event, generates the logic signals to keep both the high-side power switch and the low-side power switch turned off until the negative current has increased to the recovery level (or the magnitude of the negative current has decreased to the magnitude of the recovery level).

Figure 8:
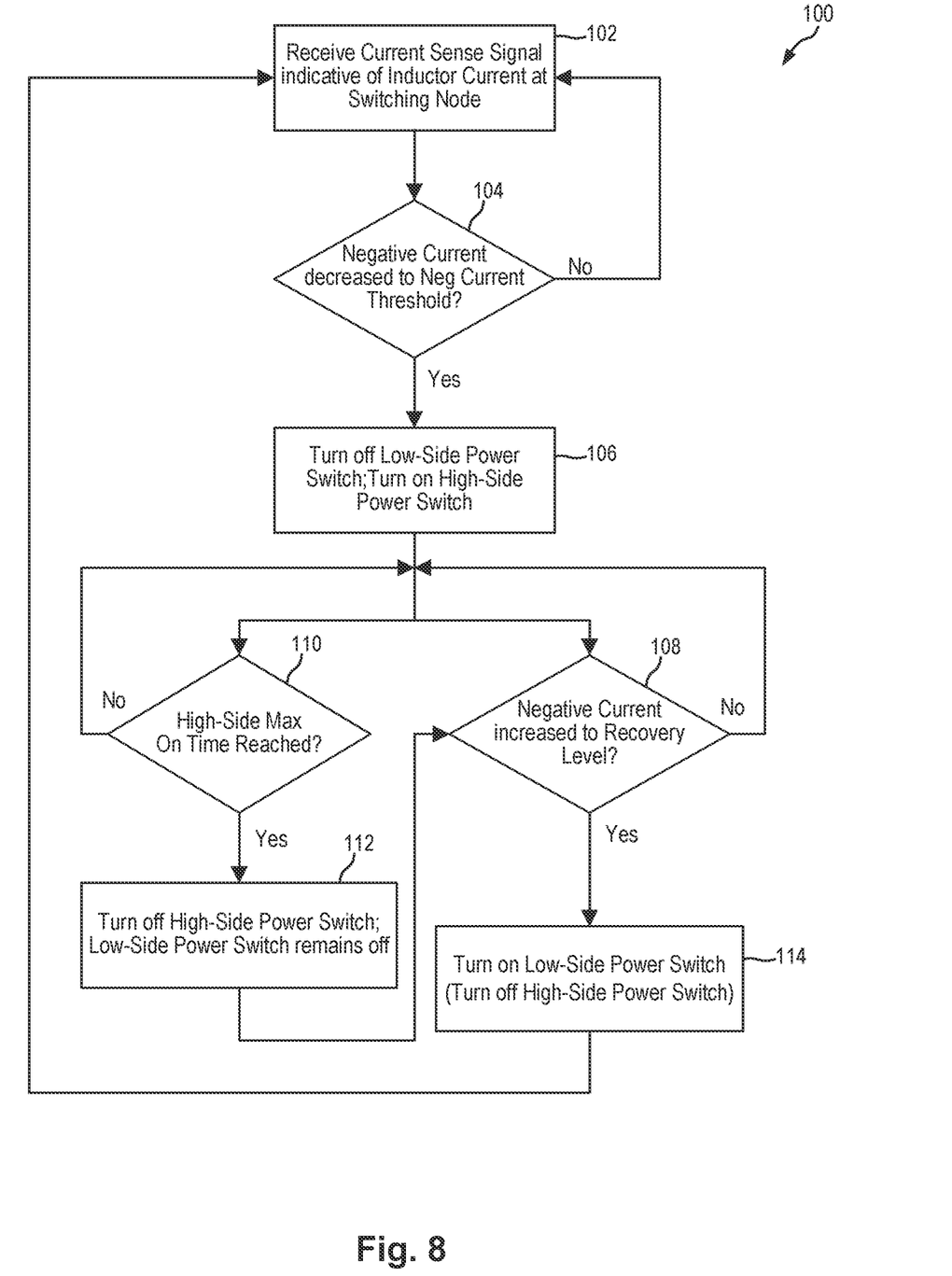
FIG. 8 is a flow chart illustrating a negative current protection method in embodiments of the present invention.

FIG. 8 is a flow chart illustrating a negative current protection method in embodiments of the present invention. In some embodiments, the negative current protection method can be implemented in the switching regulator of FIG. 1 and using the protection circuit in FIG. 6. Referring to FIG. 8, a negative current protection method 100 operates to receive a current sense signal indicative of the inductor current at the switching node of the switching regulator (102). The switching regulator is operating in normal PWM operation and the power switches are controlled by the PWM signals generated by the PWM control circuit in response to the feedback voltage and the target voltage. The method 100 detects if the inductor current has a negative current that has decreased to the negative current threshold (104). Alternately, the method 100 detects if the magnitude of the negative current has increased to the magnitude of the negative current threshold. The negative current threshold is denoted as NOCP in the above description. The method 100 continues to monitor the inductor current when the inductor current does not have a negative current value at the negative current threshold. In the event the inductor current has a negative current that has decreased to the negative current threshold, indicating a negative over-current event, the method 100 turns off the low-side power switch and turn on the high-side power switch (106). With the high-side power switch turned on, the method 100 determines if the negative current has increased to the negative current recovery level (108), indicating recovery of the negative current and the end of the negative over-current event. Alternately, the method 100 detects if the magnitude of the negative current has decreased to the magnitude of the negative current recovery level. More specifically, with the high-side power switch turned on, the high-side power switch conducts the negative current from the inductor through the switching node to the input voltage node. The method 100 continues to monitor the inductor current when the negative current has not increased to the recovery level. Meanwhile, the method 100 also determines if the high-side maximum on time has been reached (110). In response to the maximum on time being reached, the method 100 turns off the high-side power switch (112). At this time, the low-side power switch is still off and therefore both the high-side and the low-side power switches are turned off. The switching regulator is operated in the tri-state mode and the negative current is conducted through the body diode of the high-side power switch to the input voltage node.

In the case the high-side power switch reached the maximum on time before the negative current has recovered, the method 100 turns off the high-side power switch and continues to monitor the inductor current while both the high-side power switch and the low-side power switch are turned off. When the negative current finally recovers and increases to the recovery level (or the magnitude of the negative current decreases to the magnitude of the recovery level), indicating the negative over-current event has ended, the method 100 turns on the low-side power switch (114). The method 100 continues to receive the current sense signal (102) and continue to monitor for negative over-current event. In particular, the switching regulator returns to normal PWM operation and the power switches are driven by the PWM signals generated by the PWM control circuit in response to the feedback control loop, including the feedback voltage and the target voltage.

In some cases, the negative over-current event may end before the maximum on time for the high-side power switch. That is, during the time the high-side power switch is turned on, the negative current has increased to the recovery level. In that case, the method 100 turns off the high-side power switch and turns on the low-side power switch (114). The method 100 continues to receive the current sense signal (102) and continue to monitor for negative over-current event. In particular, the switching regulator returns to normal PWM operation and the power switches are driven by the PWM signals generated by the PWM control circuit in response to the feedback control loop, including the feedback voltage and the target voltage.

As thus configured, the negative current protection method 100 is effective in limiting the negative current to the negative current threshold while preventing damages to the high-side and low-side power switches from undesirable conditions such as the high-side power switch being left turned on for a long time or conditions leading to negative current runaway.

In this detailed description, process steps described for one embodiment may be used in a different embodiment, even if the process steps are not expressly described in the different embodiment. When reference is made herein to a method including two or more defined steps, the defined steps can be carried out in any order or simultaneously, except where the context dictates or specific instruction otherwise are provided herein. Further, unless the context dictates or express instructions otherwise are provided, the method can also include one or more other steps carried out before any of the defined steps, between two of the defined steps, or after all the defined steps.

In this detailed description, various embodiments or examples of the present invention may be implemented in numerous ways, including as a process; an apparatus; a system; and a composition of matter. A detailed description of one or more embodiments of the invention is provided above along with accompanying figures that illustrate the principles of the invention. The invention is described in connection with such embodiments, but the invention is not limited to any embodiment. Numerous modifications and variations within the scope of the present invention are possible. The scope of the invention is limited only by the claims and the invention encompasses numerous alternatives, modifications, and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. The present invention is defined by the appended claims.

The invention claimed is:

1. A controller for a switching regulator receiving an input voltage, the controller controlling a high-side switch and a low-side switch connected in series between the input voltage and a ground potential and configured to drive a switching node for generating a switching voltage, the switching node being coupled to an LC filter circuit including an inductor and a capacitor to generate a regulated output voltage having a substantially constant magnitude on an output node, the regulated output voltage being fed back to the controller as a feedback voltage, the controller comprising:

a control circuit configured to receive a first error signal indicative of a difference between a feedback voltage indicative of the regulated output voltage and a reference voltage, the control circuit configured to generate first and second pulse width modulation (PWM) signals for driving the high-side switch and the low-side switch, the first and second PWM signals being coupled to turn the high-side switch and the low-side switch on and off alternately to generate the switching voltage at the switching node; and a protection circuit configured to monitor a current sense signal indicative of an inductor current flowing through the inductor and responsive to the current sense signal indicating a negative current flowing through the inductor has reached a negative current threshold, the protection circuit generates control signals to turn off the low-side switch and to turn on the high-side switch; and the protection circuit continues to monitor the current sense signal and responsive to the high-side switch being turned on for a predetermined maximum on time and the current sense signal indicating the negative current has not recovered to a negative current recovery level, the protection circuit generates the control signal to turn off the high-side switch while keeping the low-side switch turned off, and responsive to the current sense signal indicating the negative current has recovered to the negative current recovery level, the protection circuit generates the control signal to turn on the low-side switch.

2. The controller of claim 1, wherein the protection circuit provides the control signals to the control circuit, the control signals generated by the protection circuit overriding the PWM signals generated at the control circuit.

3. The controller of claim 1, wherein the high-side switch is turned on to conduct the negative current through the high-side switch, and after expiration of the predetermined maximum on time and the high-side switch is turned off and before the negative current having recovered to the negative current recovery level, the high-side switch conducts the negative current through a body diode of the high-side switch.

4. The controller of claim 1, wherein responsive to the current sense signal indicating the negative current has recovered to the negative current recovery level before the maximum on time of the high-side switch, the protection circuit generates the control signals to turn off the high-side switch and to turn on the low-side switch.

5. The controller of claim 1, wherein the high-side switch and the low-side switch comprise N-channel MOSFET devices.

6. The controller of claim 1, wherein the protection circuit comprises:
- a first comparator configured to receive the current sense signal and the negative current threshold and to generate a first output signal;
- a second comparator configured to receive the current sense signal and the negative current recovery level and to generate a second output signal;
- a set-reset latch having a set input terminal configured to receive the first output signal, a reset input terminal configured to receive the second output signal, the set-reset latch generating a third output signal and a fourth output signal being an inverse of the third output signal, the third output signal having a first logical state in response to the first output signal being asserted and having a second logical state in response to the second output signal being asserted; and
- a one-shot timer circuit configured to receive the third output signal and to generate a fifth output signal, wherein in response to the third output signal transitioning to the first logical state, the one-shot timer circuit generates the fifth output signal having the first logical state for the predetermined maximum on time,
- wherein the fifth output signal is the control signal for driving the high-side switch and the fourth output signal is the control signal for driving the low-side switch.

7. A method in a controller for a switching regulator, the controller controlling a high-side switch and a low-side switch connected in series between the input voltage and a ground potential and configured to drive a switching node for generating a switching voltage, the switching node being coupled to an LC filter circuit including an inductor and a capacitor to generate a regulated output voltage having a substantially constant magnitude on an output node, the regulated output voltage being fed back to the controller as a feedback voltage, the method comprising:
- monitoring a current sense signal indicative of an inductor current flowing through the inductor;
- responsive to the current sense signal indicating a negative current flowing through the inductor has reached a negative current threshold, generating control signals to turn off the low-side switch and to turn on the high-side switch;
- responsive to the high-side switch being turned on for the maximum on time and the current sense signal indicating the negative current has not recovered to the negative current recovery level, generating the control signal to turn off the high-side switch and keeping the low-side switch turned off; and
- responsive to the current sense signal indicating the negative current has recovered to the negative current recovery level, generating the control signal to turn on the low-side switch.

8. The method of claim 7, further comprising:
- receiving a first error signal indicative of a difference between a feedback voltage indicative of the regulated output voltage and a reference voltage; and
- generating first and second pulse width modulation (PWM) signals for driving the high-side switch and the low-side switch, the first and second PWM signals being coupled to turn the high-side switch and the low-side switch on and off alternately to generate the switching voltage at the switching node,
- wherein the control signals generated in response to the current sense signal or the predetermined maximum on time override the PWM signals.

9. The method of claim 7, wherein response to the high-side switch being turned on, the high-side switch conducts the negative current through the high-side switch.

10. The method of claim 7, wherein response to the high-side switch being turned off and the current sense signal indicating the negative current has not recovered to the negative current recovery level, the high-side switch conducts the negative current through a body diode of the high-side switch.

11. The method of claim 7, wherein responsive to the current sense signal indicating the negative current has recovered to the negative current recovery level before the maximum on time of the high-side switch, generating the control signal to turn off the high-side switch and turn on the low-side switch.

12. The method of claim 7, wherein the high-side switch and the low-side switch comprise N-channel MOSFET devices.

* * * * *